UNITED STATES PATENT OFFICE.

THOMAS A. EDISON, OF LLEWELLYN PARK, WEST ORANGE, NEW JERSEY.

ART OF FORMING CHEMICAL COMPOUNDS.

1,083,355.  Specification of Letters Patent.  Patented Jan. 6, 1914.

No Drawing.  Application filed April 8, 1911.  Serial No. 619,672.

*To all whom it may concern:*

Be it known that I, THOMAS A. EDISON, a citizen of the United States, and a resident of Llewellyn Park, West Orange, in the county of Essex and State of New Jersey, have invented certain new and useful Improvements in the Art of Forming Chemical Compounds, of which the following is a specification.

The object of my invention is to cheapen the cost of production of certain classes of chemical compounds which have been heretofore produced by precipitation from solution.

More particularly, the object of my invention is to cheapen the cost of production of nickel hydroxid for use in alkaline storage batteries, and to produce an improved product for this purpose.

The product made by my improved process is claimed in my copending application Serial No. 619,674, filed herewith.

In the ordinary method of producing nickel hydroxid, the nickel hydroxid is precipitated from an aqueous solution, and then washed and dried. This method involves the use of apparatus of large capacity in proportion to the output, and the operation of washing and drying is tedious and expensive.

In my improved process, the reacting compounds are mixed together in a dry state, the water necessary for precipitation being dispensed with and the necessity for removing the same by evaporation obviated.

My invention is applicable to the manufacture of many chemical compounds which are now produced by precipitation from solution.

In the practice of my invention as applied to the manufacture of nickel hydroxid, I proceed substantially as follows:—Suitable quantities of dry nickel sulfate containing water of crystallization, and dry sodium hydroxid are reduced to powder or small particles in any suitable manner. Proper proportions of these compounds are then mixed together and brought into intimate mechanical contact in any suitable manner, preferably by subjecting the mixture to pressure and rubbing. This may be accomplished by passing and repassing the material between differential rolls, such as are employed in working rubber.

The reaction takes place between the dry powders very rapidly, the water of crystallization which is liberated serving to hasten the reaction. The resultant mixture is a tough, dough-like mass. This mass is then dried very slowly, as for example, by heating the same in a partially closed vessel such as a box with a small opening in it. By having only a small opening for the escape of the vapors produced in drying, the rate of evaporation and consequently of drying is reduced. After the mass is dried, it is broken up or crushed by any suitable means, and put in a percolator, and the soluble product or products of reaction washed out. The principal soluble reaction product is sodium sulfate, and in the practice of my improved process, a concentrated solution of sodium sulfate is obtained, constituting a valuable by-product. In fact, a considerable portion of the sodium sulfate is washed out in a saturated solution from which the sodium sulfate crystallizes without necessity of further evaporation. The resultant hydroxid is then dried and is ready for use.

In preparing nickel hydroxid for use in alkaline storage batteries, I have found it best to use from 2% to 12% excess of alkali and to dry the dough-like mass containing all of the reaction products and the excess alkali exceedingly slowly. When nickel hydroxid is prepared in this way, its specific capacity per gram to store oxygen is increased, and a greater weight of it can be loaded or packed into the tubes of the electrodes than of nickel hydroxid prepared in the ordinary way. The capacity or output of the battery is thereby increased. These results are apparently due to some change in physical structure of the product, such as increased porosity. The degree of porosity or other change in physical structure and consequently the loading weight may be controlled by varying the percentage of excess of alkali. Furthermore, some advantageous change in the physical structure of the product is apparently produced by the slow drying in the presence of the strong alkali.

My invention is applicable not only to the production of nickel hydroxid, but in general to the production of all kinds of chemical compounds, which are usually formed by precipitation from solution, where one of the reacting salts or compounds has considerable water of crystallization. For example, the process may be employed in the manufacture of oxids or hydroxids of iron, copper or cadmium, from the sulfates of these elements.

By my improved process a very large output of product is obtainable in chemical works within small space and with simple machinery, and without the great expense of using large quantities of distilled water for washing and heat for evaporating, and more economical utilization of the by-products is permitted.

Having now described my invention, what I claim as new and desire to secure by Letters Patent is as follows:—

1. The process of forming an insoluble chemical compound which consists in bringing into intimate contact with each other dry soluble compounds capable of reacting chemically, at least one of which contains water of crystallization, drying the resultant mass, and finally crushing and washing the same, substantially as set forth.

2. The process of forming chemical compounds or substances, which consists in mixing together dry compounds or substances, at least one of which contains water of crystallization, and capable of reacting chemically to form a soluble compound or substance and an insoluble compound or substance, subjecting the mixture to combined rubbing and pressure, and removing the soluble compound or substance resulting from said reaction by washing, substantially as described.

3. The process of forming a chemical compound or substance which consists in mixing together dry compounds or substances capable of reacting chemically, at least one of which contains water of crystallization, and subjecting the mixture to combined rubbing and pressure, drying the resultant mass, and finally crushing and washing the same, substantially as described.

4. The process of forming nickel hydroxid, which consists in mixing together and bringing into intimate mechanical contact in undissolved condition a salt of nickel having water of crystallization and a hydroxid, substantially as set forth.

5. The process of forming nickel hydroxid for use in alkaline storage batteries, which consists in mixing intimately a dry, pulverized salt of nickel containing water of crystallization and an excess of dry soluble hydroxid, drying the resultant mass, crushing and washing the same, and finally drying the residue, substantially as set forth.

6. The process of forming nickel hydroxid for use in alkaline storage batteries, which consists in mixing intimately a dry, pulverized salt of nickel containing water of crystallization and from 2% to 12% excess of dry soluble hydroxid, drying the resultant mass, crushing and washing the same, and finally drying the residue, substantially as set forth.

7. The process of forming nickel hydroxid for use in alkaline storage batteries, which consists in mixing intimately a dry salt of nickel containing water of crystallization and a considerable excess of dry soluble hydroxid whereby a dough-like mass is produced, drying the dough-like mass exceedingly slowly, crushing the dried mass, washing the same, and redrying the residue, substantially as described.

This specification signed and witnessed this 7th day of April, 1911.

THOS. A. EDISON.

Witnesses:
HENRY LANAHAN,
ANNA R. KLEHM.

---

Copies of this patent may be obtained for five cents each, by addressing the "Commissioner of Patents, Washington, D. C."